May 9, 1950 L. W. CHRISTENSEN 2,507,399
VARIABLE SPEED ALTERNATING CURRENT MOTOR
Filed April 5, 1947.

Inventor,
Leonard W. Christensen
By: Carl V. Gippert Atty.

UNITED STATES PATENT OFFICE 2,507,399

VARIABLE-SPEED ALTERNATING CURRENT MOTOR

Leonard W. Christensen, Milwaukee, Wis.

Application April 5, 1947, Serial No. 739,568

3 Claims. (Cl. 172—36)

The present invention relates to an alternating current motor and especially to a novel variable speed A. C. motor and to the novel means, method and manner of varying the speed of rotation of the rotor of such a motor.

Variations in the speed of operation of variable speed alternating current motors, of which the slip-ring wound rotor induction motor type is an example, is most generally obtained by external control circuits specially designed and constructed for that particular purpose. The novel motor of the present invention requires no such external control circuits but as constructed and arranged forms a compact, unitary or self-contained variable speed motor.

It is, therefore, an object of the present invention to provide a novel variable speed alternating current motor and novel means or mechanism for varying or regulating its output speed by varying a relatively small D. C. control current to thereby vary the speed of rotation for a given load.

The invention further comprehends a novel motor construction provided with a squirrel cage winding having a dual purpose, namely, to provide a support for the field poles and also to provide a starting winding for rotation of the field poles.

A further object of the present invention is the provision of a novel alternating current motor constructed with a novel control means for varying or regulating the speed of rotation of the drive shaft.

Another object of the present invention is the provision of a novel variable speed alternating current motor comprising a stator, rotating field poles and an induction motor rotor all so constructed and combined as to effectively and efficiently vary the speed of operation of said motor.

The invention further comprehends a novel self-contained variable speed alternating current motor having flux diverting means to aid in varying its speed or torque.

Further objects are to provide a construction of maximum efficiency, economy and ease of control and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment it is to be understood that the same is susceptible of modification and change and comprehends other details, arrangements of parts, features and constructions without departing from the spirit of the invention.

In the drawing—

Figure 1:
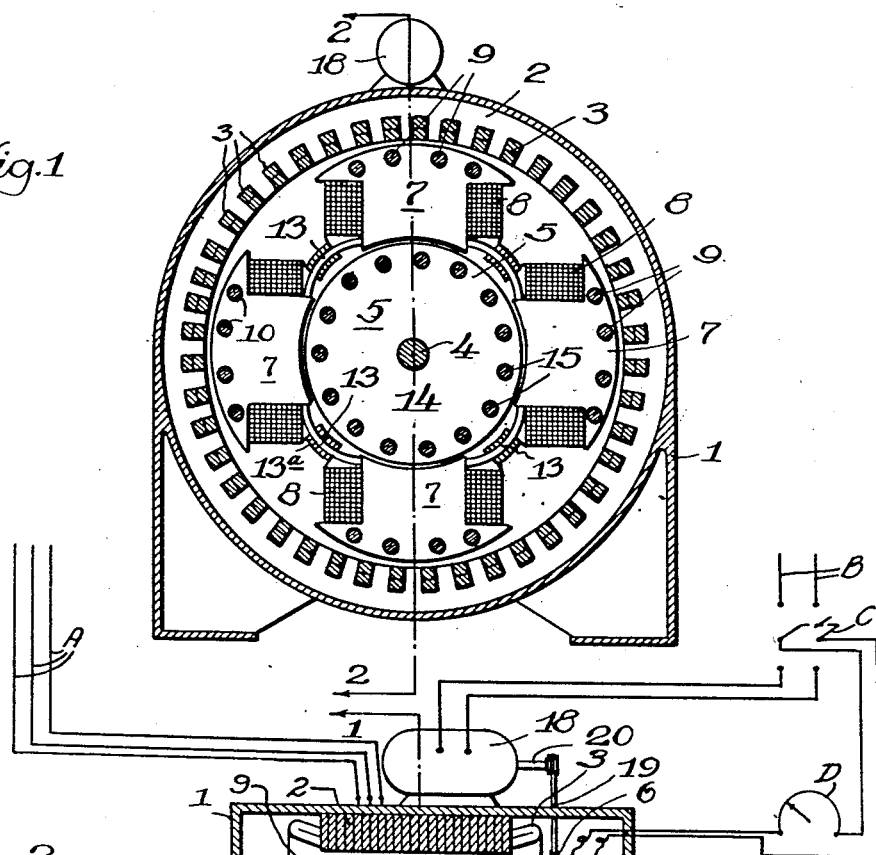
Figure 1 is a view in vertical cross-section through the motor housing and taken in a plane represented by the line 1—1 of Fig. 2.

Referring more particularly to the embodiment shown in the drawing and selected to illustrate the novel invention, the novel motor assembly comprises a housing or frame 1 in which is suitably supported a stator core 2 provided with the usual or saturated synchronous or induction motor stator winding 3. Rotatably mounted in the housing and adapted to drive a shaft 4 is a squirrel cage rotor 5 and an outer squirrel cage winding 6 supporting spaced field poles 7 and field coils 8, which are free to rotate about the rotor and shaft.

The squirrel cage winding, including the supported field poles 7, field coils 8 and the longitudinal bars 9 extending through spaced openings 10 in the pole pieces 7, has the ends of these bars extending through and carried by the end rings or plates 11 each loosely journalled by means of a hub 12 upon the shaft 4. Disposed between and connecting adjacent the pole pieces 7 are provided flux diverters 13 formed of suitable magnetic material. Additional torque for a given D. C. field current may be obtained by winding coils 13ª on the diverters in series with the field coils. These diverter coils are wound in such a direction as to oppose the flux going through the diverters, whereby more of the field coil flux will link the rotor and thereby giving more torque for a given D. C. field current.

The stator core 2, field poles 7 and rotor 5 are preferably of laminated iron, while the end plates 14 of this squirrel cage rotor are of copper and the laminations of the rotor retained by means of the spaced bars 15.

If a polyphase voltage is applied to the stator winding 3 through the A. C. supply lines A, a rotating field of flux will be set up which will link the outer squirrel cage winding 6 and cause the latter to rotate by induction motor action. As disclosed, the squirrel cage winding functions both as a mechanical support for the field poles 7 which rotate about the shaft 4, and as a starting winding for the rotation of these field poles. Part of the stator flux will link the inner squirrel cage rotor 5 causing it to rotate with a certain torque. After the field poles 7 are approximately in synchronism with the stator flux, a direct current voltage from the D. C. supply lines B may be applied to the field coils 8 through the brushes 16 and slip-rings 17, whereby to lock the field poles 7 in synchronism with the rotating stator flux in a manner similar to that in a synchronous motor.

Figure 2:
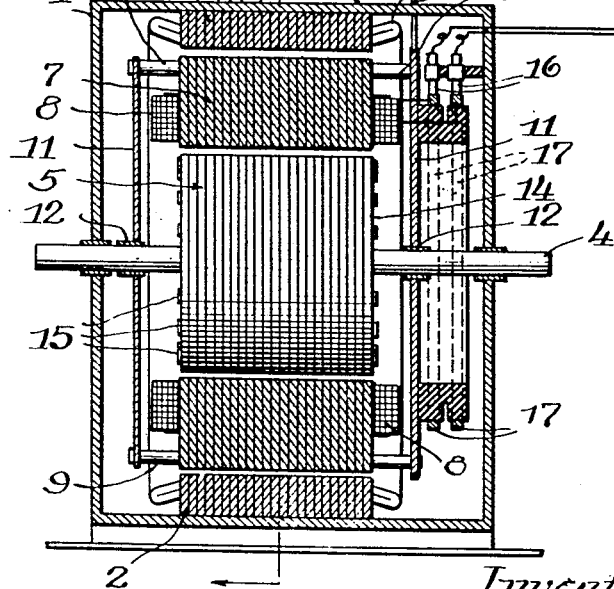
Fig. 2 is a view in vertical cross-section through the motor assembly, the view being taken in a plane represented by the line 2—2 of Fig. 1 but showing the rotor and exciter in side or end elevation.

A D. C. exciter 18 is shown as suitably connected to the end plate 11 of the outer squirrel cage winding, which is constantly in motion when the motor is in operation. As shown in Fig. 2, this may be accomplished by a belt or other suitable drive 19 from the shaft 20 of the exciter. An exciter such as may be connected to the shaft of a synchronous machine may be employed for the purpose of supplying the D. C. voltage for excitation of the field coils in case there is no D. C. voltage available at the motor installation. A double-pole, double-throw switch C is provided for connecting the D. C. supply either from the supply lines B or from the exciter 18 through a rheostat D to the brushes 16 and slip rings 17.

With no direct current in the field coils 8, the amount of torque in the rotor is determined by the amount of stator flux linking the rotor conductors. By employing the flux diverters 13, a wider range of speed variation may be obtained. These will divert some of the stator flux from the rotor causing it to rotate at a lower torque, the amount of diversion being determined by the construction and arrangement of the diverters. Thus the diverters give the field current a wider control of the rotor speed or torque.

As an example of the operation of the present invention, with no current in the field coils the amount of armature flux cutting the rotor conductors will determine the rotor speed. With the flux in the diverters near saturation under this condition, the flux cutting the rotor conductors will be small. If the field current now flows through the field coils, part of the field flux will link the rotor and as the diverters will be saturated and any additional flux linking the rotor must come from the field, the current in the field coils will thereupon control the speed of the rotor for any given load.

Assuming the present motor is employed in driving a fan load for which it is well adapted, when a polyphase voltage is applied to the stator windings 3, a rotating field of flux will be set up which will link the outer squirrel cage winding 6 and cause the latter to rotate by induction motor action. A part of this armature flux cutting the rotor conductors will impart a small given torque to the rotor 5. With the flux in the diverters near saturation under this condition, the flux cutting the rotor will be small. The field pole assembly may rotate slightly under synchronous speed and the rotor will have a high slip relative to the field pole assembly.

If the D. C. excitation is now applied to the field coils through the slip rings, and with sufficient D. C. control current in the field coils 8 they will lock in and rotate in synchronism with the rotating stator flux. When this control current is applied to the field coils, the main magnetic flux to vary the speed is established. Since these field coils are now rotating at synchronous speed, this magnetic flux will cut the cage bars of the rotor 5. Currents are thus induced in the cage bars creating magnetic fields in the rotor which react with the flux of the rotating field coils and thus produce a rotational torque. The maximum speed at which the rotor can revolve will always be somewhat lower than synchronous speed because some slip is necessary to induce current in the cage bars of the rotor.

The purpose of the flux diverters 13 is to divert as much of the armature flux from the rotor 5 as practically possible under conditions of no excitation. The coils 13a on the diverters are wound in such a way as to oppose this flux when the field or control current is applied to the field coils 8. Since these coils are in series with the field coils, as the control current is increased the flux cutting the rotor 5 will increase and the diverter coils 13a will tend to oppose the flux going through the diverters 13 forcing more of the total flux through the rotor and thereby increase the torque output.

The rotor has no basic speed. It is variable and is dependent at any time on two factors: (1) On the amount of control current (which as explained above determines the torque transmitted to the fan by the rotor), and (2) on the torque required by the fan (which varies approximately as the square of its speed). At any given value of control current, the rotation of the rotor will stabilize at the speed where the torque transmitted and the torque required by the fan are equal. Thus for each per cent of full load control current, the fan operates at a definite per cent of full speed. The control current can of course be varied at will during the operation and is a precise and easy means for varying the speed of the motor and consequently the ultimate load which in this case is the fan.

From the above description and the disclosure in the drawing, it will be apparent that the present invention comprehends a novel variable speed alternating current motor, the control circuit required being only a rheostat D to vary the D. C. control current to the field coils to vary the speed for a given load.

It will thus be appreciated that the present novel invention results in a novel motor of the variable speed alternating current type which requires but a simple control and at an appreciably decreased cost of control equipment, and one that is highly effective and efficient in operation.

Having now described my invention, I claim:

1. A variable speed alternating current motor, a housing, a stator supported in the housing and including a core and windings, a rotor and shaft rotatably mounted in the housing, a squirrel cage winding encompassing the rotor, spaced field poles and field coils free to rotate about the rotor and shaft and supported by the squirrel cage winding whereby the latter functions as a mechanical support for the field poles which rotate about the shaft and as a starting winding for the rotation of these field poles, flux diverters disposed between and connecting adjacent field poles and rotatable therewith and means for supplying direct current to the field coils, whereby to control the speed and torque of the rotor.

2. In a variable speed alternating current motor, a housing, a stator core and winding in the housing, a shaft, a squirrel cage rotor and an encompassing squirrel cage winding rotatably mounted in the housing for rotating the shaft, spaced field poles and field coils carried by the squirrel cage winding and free to rotate about the rotor and shaft, flux diverting means disposed between adjacent field poles and comprising members connecting adjacent field poles and rotatable therewith and coils wound on said members in series with the field coils and in a direction so as to oppose the flux through said members, and means for supplying direct current to the field coils, whereby the current in the field coils will thereupon control the speed of the rotor for any given load.

3. In a variable speed alternating current motor, a housing, a stator, a rotor and a shaft rotatable in the housing, a squirrel cage winding encompassing the rotor and shaft and free to rotate relative thereto, field poles and field coils carried by and rotatable with the squirrel cage winding about the rotor and shaft, said winding providing a mechanical support for the field poles and a starting winding for the rotation of these field poles, flux diverters connecting adjacent field poles and rotatable therewith, and means for supplying direct current to the field coils whereby to control the speed and torque of the rotor.

LEONARD W. CHRISTENSEN.

REFERENCES CITED

The following references are of record in the file of this patent:

UNITED STATES PATENTS

| Number | Name | Date |
|---|---|---|
| 912,144 | Mavor | Feb. 9, 1909 |
| 925,499 | Parsons et al. | June 22, 1909 |
| 1,675,960 | Schon et al. | July 3, 1928 |
| 2,246,372 | Lockwood et al. | June 17, 1941 |

FOREIGN PATENTS

| Number | Country | Date |
|---|---|---|
| 125,570 | Switzerland | Apr. 16, 1928 |
| 13,481 | Great Britain | of 1915 |